(12) United States Patent
    Gast

(10) Patent No.: US 8,548,506 B2
(45) Date of Patent: *Oct. 1, 2013

(54) WIRELESS STATION LOCATION DETECTION

(75) Inventor: Matthew S. Gast, San Francisco, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,861

(22) Filed: Aug. 7, 2012

(65) Prior Publication Data

US 2012/0300708 A1    Nov. 29, 2012

Related U.S. Application Data

(63) Continuation of application No. 11/944,346, filed on Nov. 21, 2007, now Pat. No. 8,238,942.

(51) Int. Cl.
    *H04W 24/00*    (2009.01)

(52) U.S. Cl.
    USPC ........ 455/457; 455/67.14; 455/522; 370/331; 370/324; 370/337; 370/519

(58) Field of Classification Search
    USPC .............. 455/457, 67.14, 522; 370/331, 324, 370/337, 519
    See application file for complete search history.

(56) References Cited

U.S. PATENT DOCUMENTS 7,058,414 B1 *   6/2006  Rofheart et al. ........... 455/456.4
2008/0261615 A1 * 10/2008 Kalhan ...................... 455/456.1

* cited by examiner

*Primary Examiner* — Nimesh Patel

(57) ABSTRACT

A technique for locating a device uses connectivity to find a distance between an access point (AP) and a device. The AP transmits a frame to a device and receives an acknowledgement frame from the device. The amount of time for a signal to pass between the AP and the device is estimated and multiplied by the speed of light to find the distance between the AP and the device.

20 Claims, 13 Drawing Sheets

WIRELESS STATION LOCATION DETECTION

CROSS REFERENCE TO RELATED APPLICATION

This application is a continuation of U.S. application Ser. No. 11/944,346, entitled "WIRELESS STATION LOCATION DETECTION," filed Nov. 21, 2007, which is incorporated herein by reference in its entirety.

BACKGROUND

Devices on a network may be considered client devices or rogue devices. Generally, clients have permission to use the network, and rogues do not. For rogues, elimination is desirable. It may be possible that an operator of the rogue device may attempt to frustrate efforts to find the rogue. A rogue device at an unknown location may be difficult to eliminate, requiring the use of strong countermeasures, e.g. suppression of service.

An existing approach uses a received signal strength indicator (RSSI) to locate devices. RSSI levels may be used to estimate a device distance. High RSSI is indicative of closer proximity than low RSSI. The RSSI approach may yield poor results because client transmit power is usually unknown. Further, a precise model of a radio environment is generally unavailable.

Another existing approach uses time differences of arrival (TDOA). TDOA removes signal attenuation from the calculation. However, TDOA is similarly flawed in that nanosecond clocks are generally not synchronized and synchronizing them is difficult. Further, in TDOA, paths to the location avoids obstacles in different ways. Varying path lengths from varying points may cause TDOA to suffer in quality when higher numbers of different points are used to find a location. This is counter intuitive because a greater number of measurements would seem to lead to a more accurate location.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for locating a device may involve transmitting a frame to a device and receiving an acknowledgement frame from the device. The amount of time for a signal to pass between the AP and the device may be estimated and multiplied by the speed of light to find the distance between the AP and the device. Many distances calculated from many APs may be used to determine a location of the device. Sometimes a single AP may be used to find possible locations of a device in two dimensions. In three dimensions, a number of APs may by used to locate a device, such in an outdoor network.

Advantageously, locating a device may ease a burden of responding to the device. For example, a located rogue may be eliminated without suppressing service. Advantageously, the rouge is eliminated while service remains unaffected.

Consider, for the purposes of example only, a rogue device operated by a rogue operator that does not have permission to use a network. The rogue device is well hidden in a building. In some cases a network administrator may employ countermeasures, shutting down service to portions of the network that the rogue would use. However, using the technique disclosed herein, the rogue is located, security is dispatched, and the rogue computing device is quickly eliminated without interrupting service. Users of the network may remain unaware that an intruding rogue was ever present.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
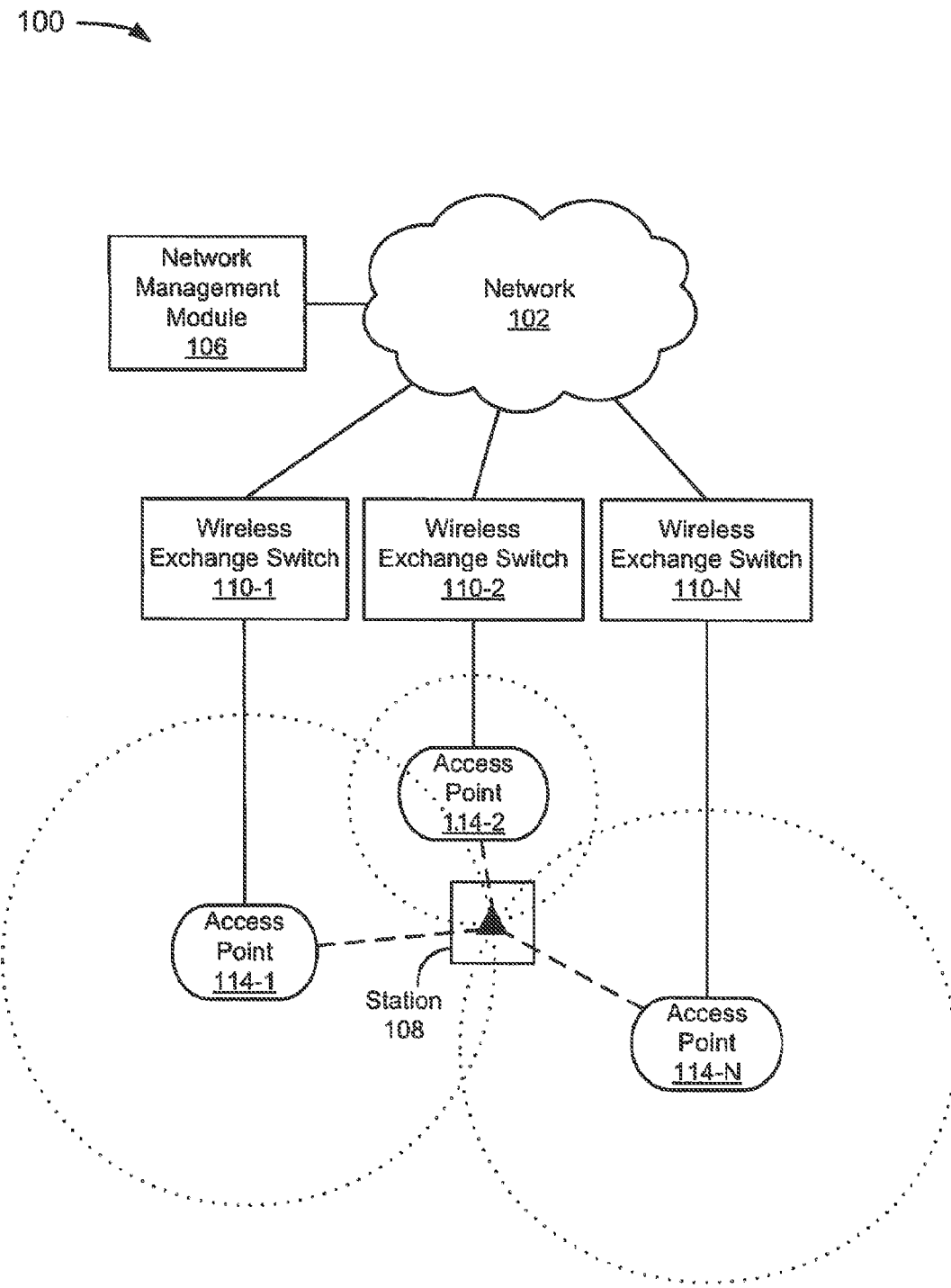
FIG. 1 depicts a diagram of an example of a system including a wireless access domain.

FIG. 1 depicts a diagram 100 of an example of a system including a wireless access domain. The system 100 includes network 102, network management module 106, station 108, wireless exchange switch 110-1, wireless exchange switch 110-2, wireless exchange switch 110-N (collectively wireless exchange switches 110), access point 114-1, access point 114-2, access point 114-N (collectively access points 114).

In the example of FIG. 1, the network 102 may be practically any type of communications network. By way of example but not limitation, the wireless access domain 104 may be referred to as, a Local Area Network (LAN), virtual LAN (VLAN), and/or wireless LAN (WLAN).

In the example of FIG. 1, the network management module 106 may be practically any type of component or device that is capable of communicating with a communications network, such as, by way of example but not limitation, a mainframe or a workstation as well as a module coupled to or operating in software on a server, AP, wireless exchange switches or other network component.

In the example of FIG. 1, the station 108 may be any computing device, by way of example but not limitation, a laptop, a wireless telephone, or any device capable of communication on a wireless network. A station, as used herein, may be referred to as a device with a media access control (MAC) address and a physical layer (PHY) interface to the wireless medium that comply with the IEEE 802.11 standard. As such, the access points 114 are typically also stations. In alternative examples, a station may comply with a different standard than IEEE 802.11, and may have different interfaces to a wireless or other medium. The station 108 may include a radio capable of generating signals compatible with communication on one or more networks. The station 108 may be in radio communication with one or more of the access points 114.

In the example of FIG. 1, wireless exchange switches 110 may swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown).

The wireless exchange switches 110 provide forwarding, queuing, tunneling, and/or some security services for the information the wireless exchange switches 110 receive from their associated access points 114. The wireless exchange switches 110 coordinate, may provide power to, and/or manage the configuration of the associated access points 114. An implementation of a wireless exchange switches, provided by way of example but not limitation, includes a Trapeze Networks Mobility Exchange® switch. The Trapeze Networks Mobility Exchange® switches may, in another implementation, be coordinated by means of the Trapeze Access Point Access™ (TAPA™) protocol.

In a non-limiting example, the access points 114 are hardware units that act as a communication hub by linking wireless mobile stations such as PCs to a wired backbone network. In an example the access points 114 connect users to other users within the network and, in another example, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System® Mobility Point® (MP®) access point.

The access points 114 are stations that transmit and receive data (and may therefore be referred to as transceivers) using one or more radio transmitters. For example, an access point may have two associated radios, one which is configured for IEEE 802.11 a standard transmissions, and the other which is configured for IEEE 802.11b standard transmissions. In a non-limiting example, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

Figure 2:
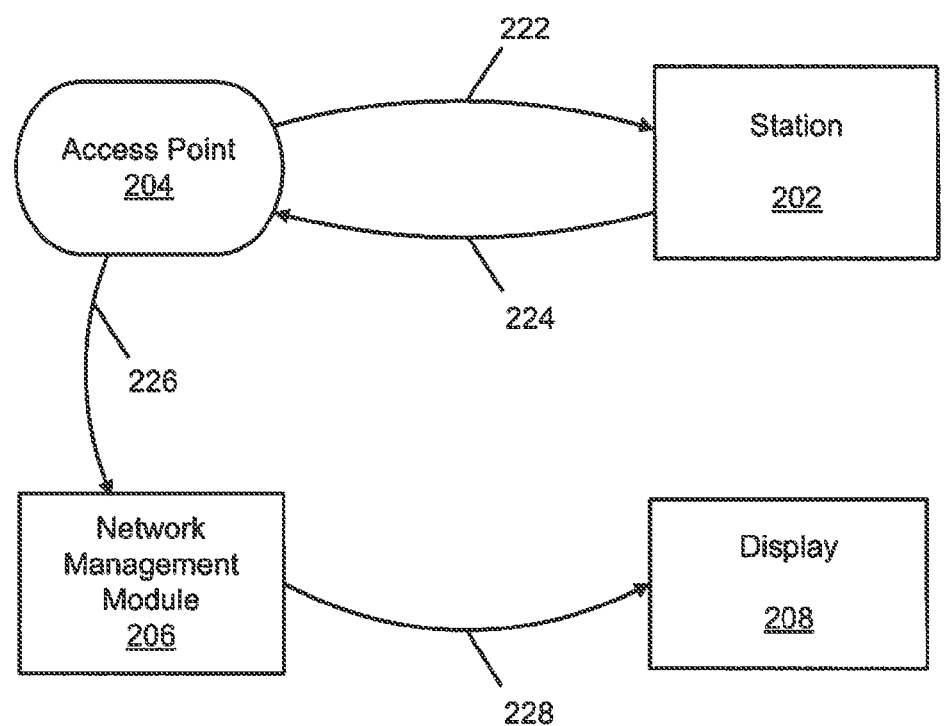
FIG. 2 depicts a diagram of an example of a system transmitting a frame, receiving an acknowledgement frame, calculating a distance to a station, and displaying results.

FIG. 2 depicts a diagram 200 of an example of a system transmitting a frame, receiving an acknowledgement frame, calculating a distance to a station, and displaying results. In the example of FIG. 2, the diagram 200 includes station 202, access point 204, network management module 206, display 208, frame transmission indicator 222, acknowledgement frame transmission indicator 224, location data communication indicator 226, and display of contents indicator 228.

Station 202 may be a device capable of radio communication with one or more access points. In a non-limiting example, the station 202 may be configured for communication using IEEE 802.11 standard communication, but any known or convenient standard for communication may be used.

Access point 204 may be an access point as discussed in reference to FIG. 2, and may be capable of communication with one or more stations via IEEE 802.11 standard communications. Network management module 106 may be practically any type of component or device that is capable of communicating with a communications network, such as, by way of example but not limitation, a mainframe or a workstation as well as a module coupled to or operating in software on a server, AP, wireless exchange or other network component.

Network management module 206 may be practically any type of component or device that is capable of communicating with a communications network. A workstation as well as a module coupled to or operating in software on a server, AP, wireless exchange or other network component could be used. Access point 204 may be coupled to, or contain network management module 206. AP 204 and network management module 206 may further be modules in another component such as a wireless exchange switch.

Display 208 may provide a view of a layout of a building, floorplan, or other known or convenient manner of visualizing an environment including APs and stations. AP 204 may be displayed on display 208. Station 202 may be displayed on display 208. Display 208 may be connected to network management module 206 and display information provided by network management module 206.

In the example of FIG. 2, in operation, AP 204 transmits a frame to station 202. Frame transmission indicator 222 depicts the transmission of the frame from AP 204 to station 202. The frames may be null frames. Typically, null frames have headers, but not payload. AP 204 records a time of transmission of the frame.

Such frames may be referred to as "ping" frames. Because of variance in acknowledgement over time, a single ping frame may be insufficient to acquire an accurate estimate of a distance between an AP and a device. It may be advantageous to use multiple ping frames and average a round trip time for transmitting a ping frame and receiving an acknowledgement frame. Averaging many values may lead to a more accurate estimate of the distance between the AP and the device. Multiple pings may be coordinated to occur during ActiveScan intervals to avoid interruptions in service.

A rogue device may encrypt data in transmission, and refuse to respond to frames that do not have proper encryption keys. However, by using a null frame, a rogue device may respond regardless of encryption. A rogue device may refuse to transmit an Acknowledgement frame. A system may respond by denying the rogue device use of system resources, and if necessary, completely suspending service to a portion of the network, or the entire network. This response may be automatic, or may be manually initiated by an administrator.

It may be necessary to "spoof" or supply an inaccurate 802.11 frame control field sequence number to be accepted by a device, however, many 802.11 i implementations do not validate an 802.11 frame sequence number. A device may check the TKIP (Temporal Key Integrity Protocol), or CCMP Packet No. (Counter Mode with Cyper Block Chaining Message Authentication Code Protocol) instead. A rogue device may accept the transmitted ping frame, and respond with an acknowledgement frame.

In the example of FIG. 2, acknowledgement frame transmission indicator 224 depicts station 202 transmitting an acknowledgement frame. AP 204 receives the acknowledgement frame, and records a time of receipt of the acknowledgement frame.

In the example of FIG. 2, AP 204 provides location data to network management module 206. Location data communication indicator 226 shows AP 204 communicating time of transmission of the frame and time of receipt of the acknowledgement frame to network management module 206. Network management module 206 calculates a distance d between AP 204 and station 202.

In the example of FIG. 2, display of contents indicator 228 depicts network management module 206 providing location information to display 208. The location information may be based on the distance d between the AP and the station to display 208 as indicated by display of contents indicator 228. Location information may be in the form of an identification of the location of the station, multiple possible locations for the station, or other information about the location of station 202.

Figure 3:
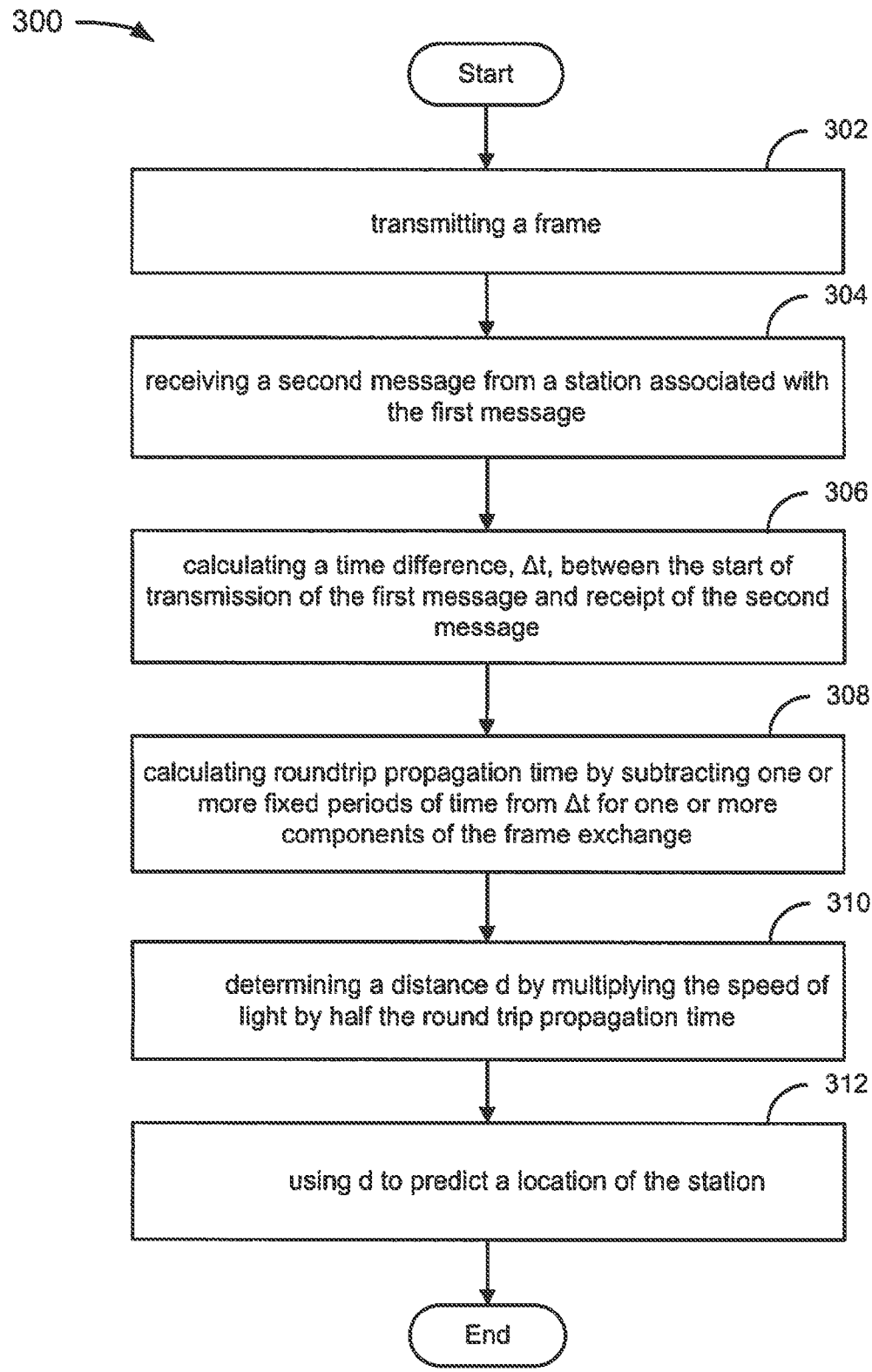
FIG. 3 depicts a flowchart of an example of a method of estimating a location of a station.

FIG. 3 depicts a flowchart 300 of an example of a method of estimating a location of a station. The method is organized as a sequence of modules in the flowchart 300. However, it should be understood that these and modules associated with other methods described herein may be reordered for parallel execution or into different sequences of modules.

In the example of FIG. 3, the flowchart 300 starts at module 302 with transmitting a frame. At the beginning of transmission, a time $t_0$ may be recorded indicating the beginning of transmission.

In the example of FIG. 3, the flowchart 300 continues to module 304 with receiving a second message from a station associated with the first message. Here, the acknowledgement frame is received at a time which is later than $t_0$. This time may be recorded as $t_1$.

In the example of FIG. 3, the flowchart 300 continues to module 306 with calculating a time difference, $\Delta t$, between the start of transmission of the first message and receipt of the second message. $t_0$ may be a time of beginning of transmission of the first message. $t_1$ may be a time of receipt of the second message. $\Delta t$ may be calculated by subtracting $t_0$ from $t_1$: $\Delta t = t_0 - t_1$.

In the example of FIG. 3, the flowchart 300 continues to module 308 with calculating roundtrip propagation time by subtracting fixed periods of time from $\Delta t$ for components of the frame exchange. Fixed periods of time may include time to complete a physical layer convergence procedure (PLCP), a Media Access Control (MAC) Header, frame check sequence (FCS), short inter-frame space (SIFS), physical layer convergence procedure (PLCP), Media Access Control (MAC) Header, and frame check sequence (FCS). These fixed time periods are known so they may be stored. By subtracting fixed periods of time from $\Delta t$, the remaining time is equal to the amount of time that the transmitted frame, and the acknowledgement frame traveled between the station and the AP, or the round trip propagation time.

In the example of FIG. 3, the flowchart 300 continues to module 310 with determining a distance d by multiplying the speed of light by half the round trip propagation time. It is necessary to divide the round trip propagation time by two because the round trip includes traveling the distance between the AP and the station and then traveling between the station and the AP. The speed of light is used because the signals which transmit the frame travel at approximately the speed of light.

Figure 7:
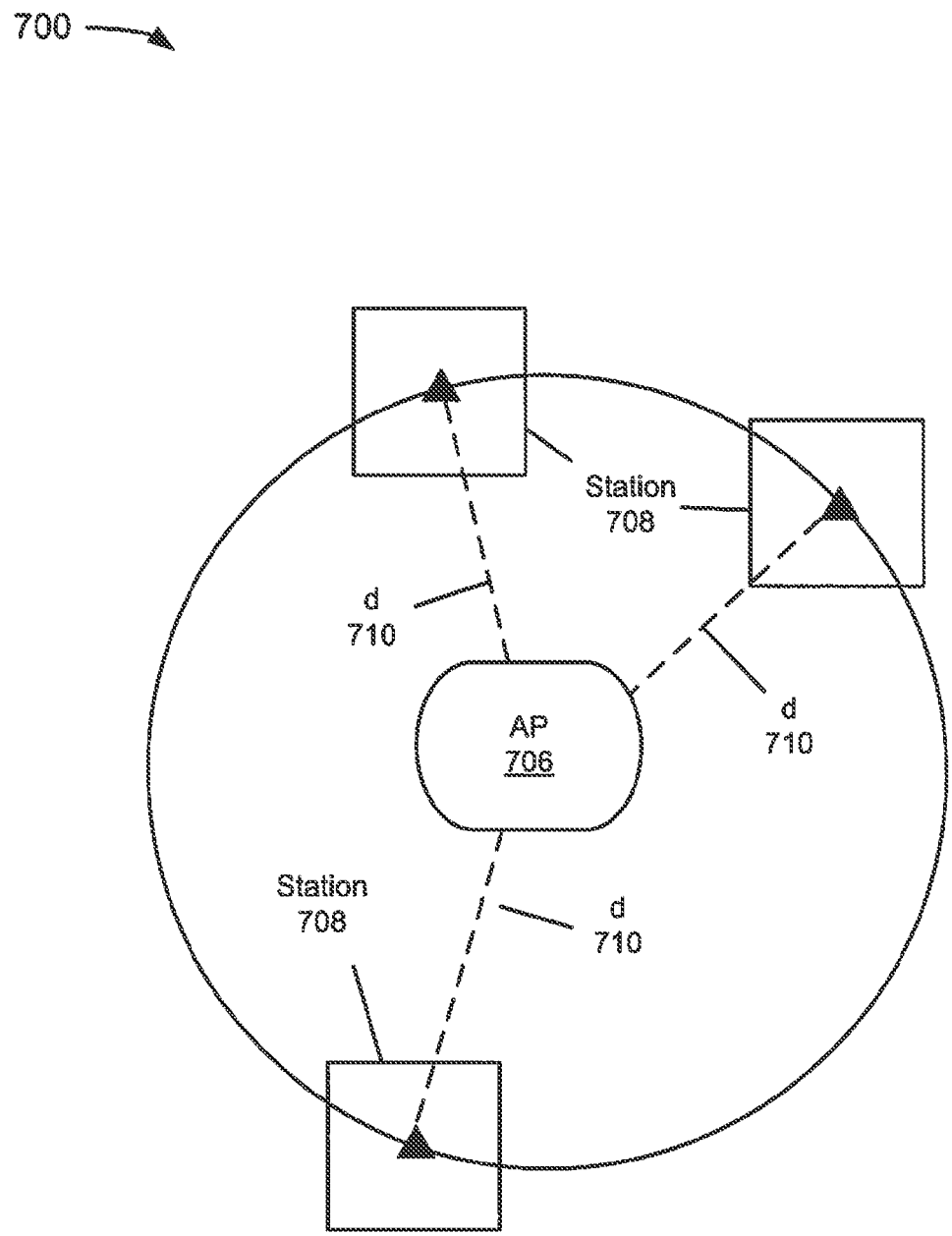
FIG. 7 depicts a diagram of an example of a plurality of possible locations for a station a distance d away from an access point.

In the example of FIG. 3, the flowchart 300 continues to module 312 with using d to estimate a location of the station. In two dimensions, knowing that the station is a distance d from the AP allows a location to be estimated in terms of points on a circle a distance d away from the AP, as depicted in FIG. 7. If more than one AP is used, the intersection of circles may be used to find possible locations of a station as discussed relative to FIGS. 8-9. For estimation in three dimensions, refer to the discussions of FIG. 9 and FIG. 10. Having estimated the location of a station, the flowchart ends.

Figure 4:
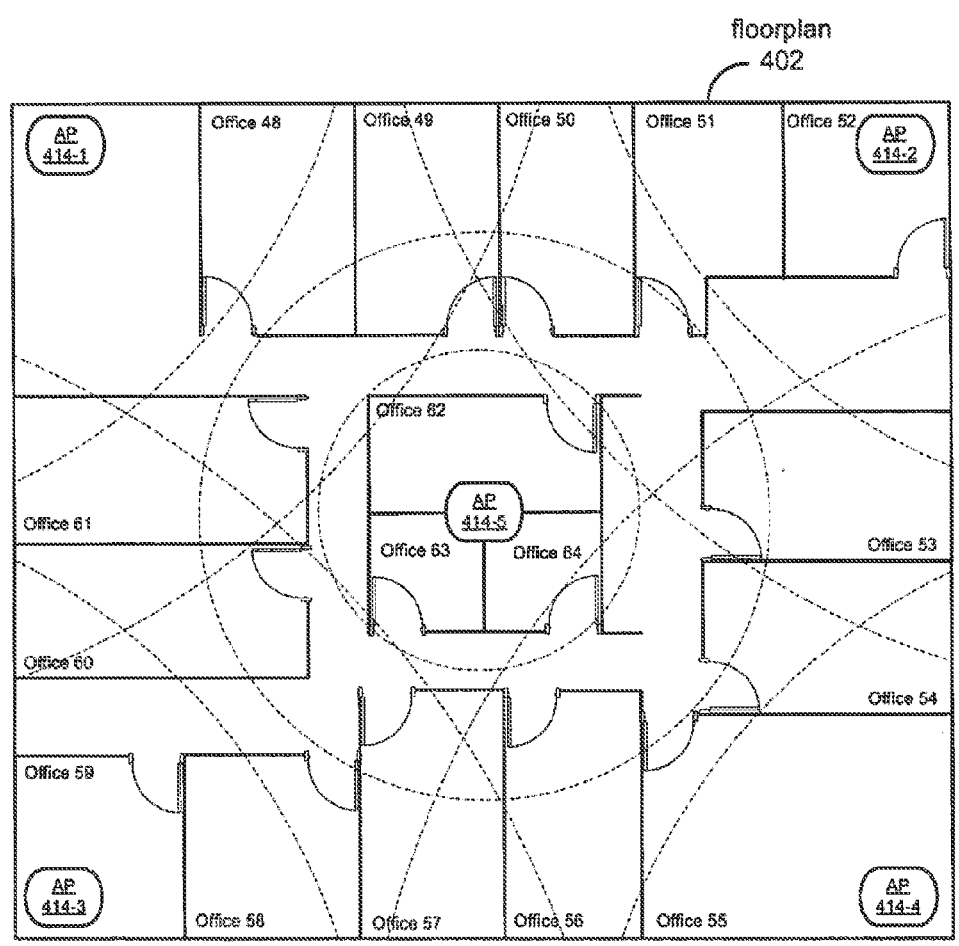
FIG. 4 depicts a diagram of an example of a floor plan including APs for a wireless access domain.

FIG. 4 depicts a diagram 400 of an example of a floor plan including APs for a wireless access domain. FIG. 4 includes floorplan 402, AP 414-1, AP 414-2, AP 414-3, AP 414-4 and AP 414-5 (Collectively, APs 414). In the example of FIG. 4, devices present in the offices depicted in floorplan 402 may connect to one or more of APs 414. APs 414 may be included as a part of a larger wireless access domain including wireless exchange switches and one or more network management modules. The APs may be coupled together via conventional network wiring.

In the example of FIG. 4, five APs may provide high quality service throughout all offices and hallways of the offices depicted in floorplan 402. Some APs may not be accessible from some locations on the floor plan. In a non-limiting example, AP 414-1 may not be accessible from office 54. Similarly parts of office 55 may receive no signal or only a weak signal from AP 414-5, and may receive no signal from AP 414-1. Weak signal strength or a low number of APs may negatively impact the ability of a network of APs to locate a station. For installations in which only a single AP provides a strong signal to an office, a distance to a station may be calculated. However, such a predicted distance to the station may indicate an infinite number of locations on a circle a distance d away from the AP.

The floor plan depicted in FIG. 4 could be a part of a network management module display in which the floor plan is depicted graphically, and clients, and rogues are graphically displayed by their estimated locations.

Figure 5:
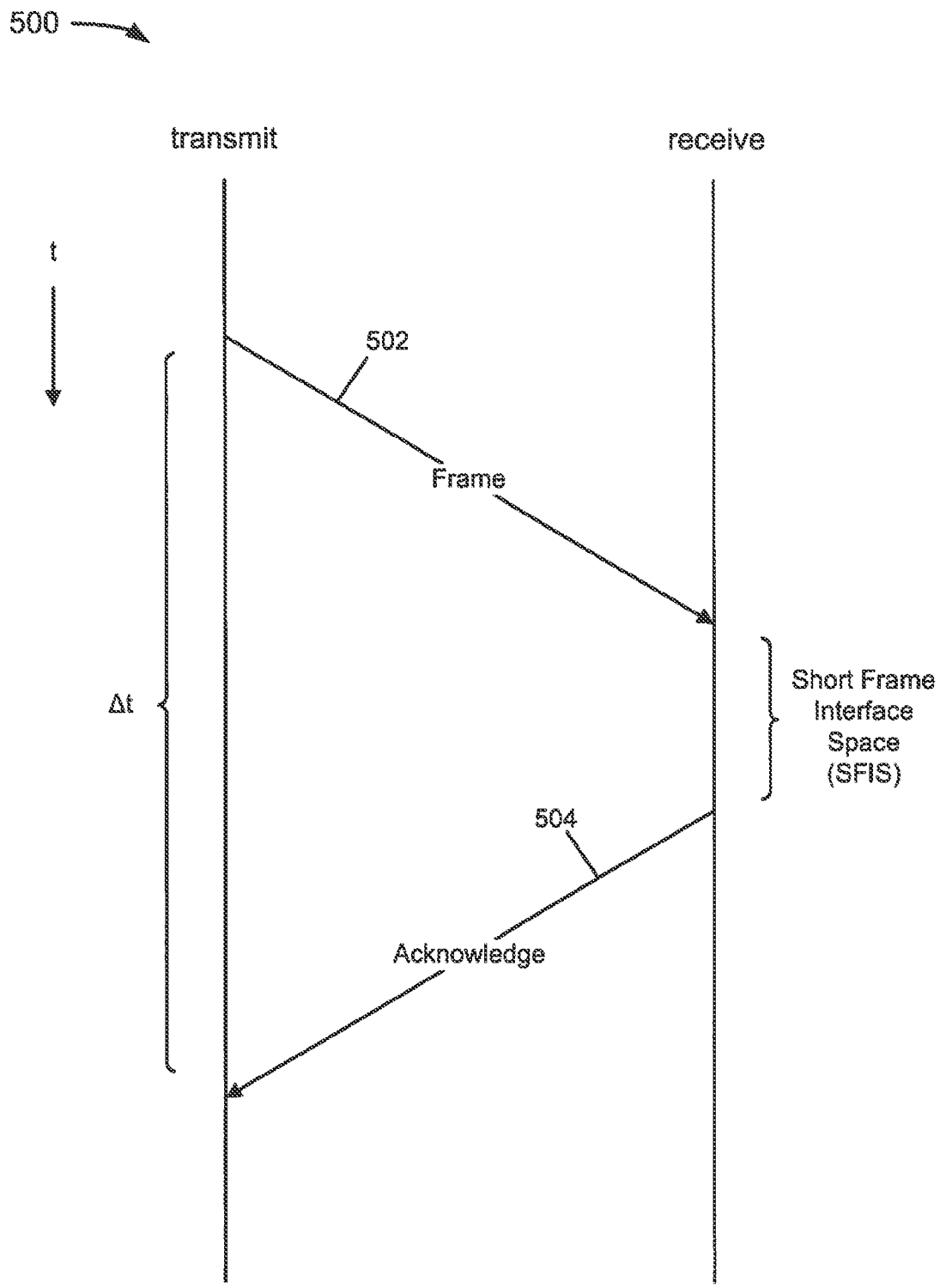
FIG. 5 depicts a diagram of an example of a sequence of transmitting a frame and receiving an acknowledgement frame.

FIG. 5 depicts a diagram 500 of an example of a sequence of transmitting a frame and receiving an acknowledgement frame. Diagram 500 includes frame transmission indicator 502, and acknowledge frame transmission indicator 504. A first ping frame is sent as shown by frame transmission indicator 502. Next acknowledgement frame transmission indicator 504 shows the transmission of an acknowledgement frame. Time spent between receipt of the transmitted frame but before sending an acknowledgement frame is referred to as a short frame interface space.

Figure 6:
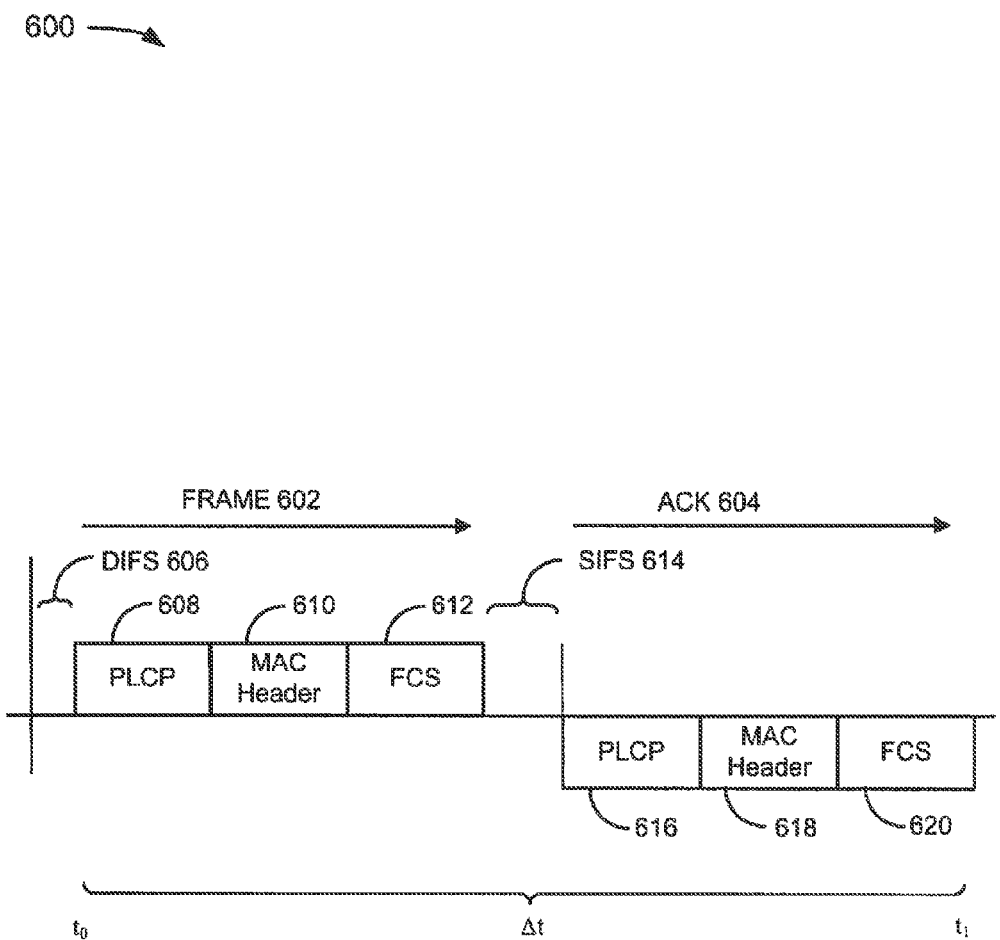
FIG. 6 depicts a diagram of fixed time components as a part of a sequence of transmitting a frame and receiving an acknowledgement frame.

FIG. 6 depicts a diagram 600 of fixed time components as a part of a sequence of transmitting a frame and receiving an acknowledgement frame. Diagram 600 includes frame transmission indicator 602, acknowledgement (ACK) frame transmission indicator 604, distributed inter-frame space (DIFS) 606, physical layer convergence procedure (PLCP) 608, Media Access Control (MAC) Header 610, frame check sequence (FCS) 612, short inter-frame space (SIFS) 612, physical layer convergence procedure (PLCP) 616, Media Access Control (MAC) Header 618, and frame check sequence (FCS) 620.

In subtracting time components for PLCP 608, MAC Header 610, FCS 612, PLCP 616, MAC Header 618, and FCS 620 from Δt, the remaining time may be attributed to the travel a round trip between the station and the AP. Half this time may be the amount of time for one frame to travel between the station and the AP.

FIG. 7 depicts a diagram 700 of an example of a plurality of possible locations for a station a distance d away from an access point. Diagram 700 includes access point 706, station 708, and distance (d) 710. This diagram assumes a two dimensional layout, such as a floorplan of an office. In such a case, the station will be a distance d away from the AP at a location that lies approximately on a circle or arc around the station with a radius equal to the distance. In order to locate a device with more specificity, it may be necessary to use more than one AP. However, where a floor plan is such that the AP may only identify a limited range of locations, such as in a corner of a building, fewer points than necessary to comprise a whole circle may be used. In such a case, the possible locations will lie on an arc instead of a circle.

Figure 8:
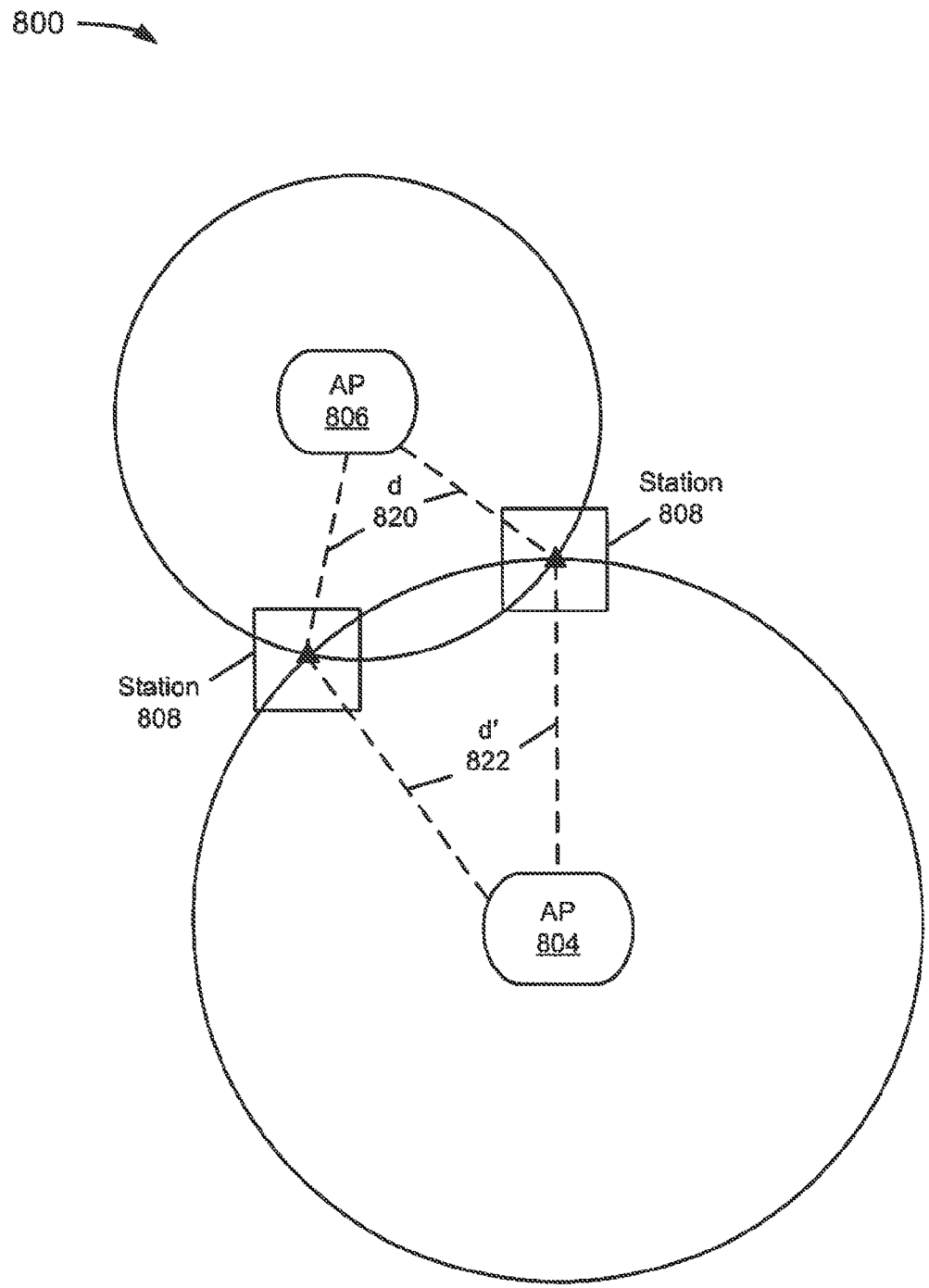
FIG. 8 depicts a diagram of an example of two possible locations for a station at points at which the station is a distance d away from the first station and a distance d" away from the second station.

FIG. 8 depicts a diagram 800 of an example of two possible locations for a station at points at which the station is a distance d away from the first station and a distance d" away from the second station. Diagram 800 includes access point (AP) 804, access point (AP) 806, station 808, distance (d) 820, and second distance (d') 822. Where two APs are used to reduce the number of potential locations for a station, there will be two distances d 820 and d' 822. The two distances d 820 and d' 822 will sweep circles around the APs. So long as the APs are not each at exactly the same location and have overlapping coverage areas, they will intersect at two points. Two possible locations are depicted.

Figure 9:
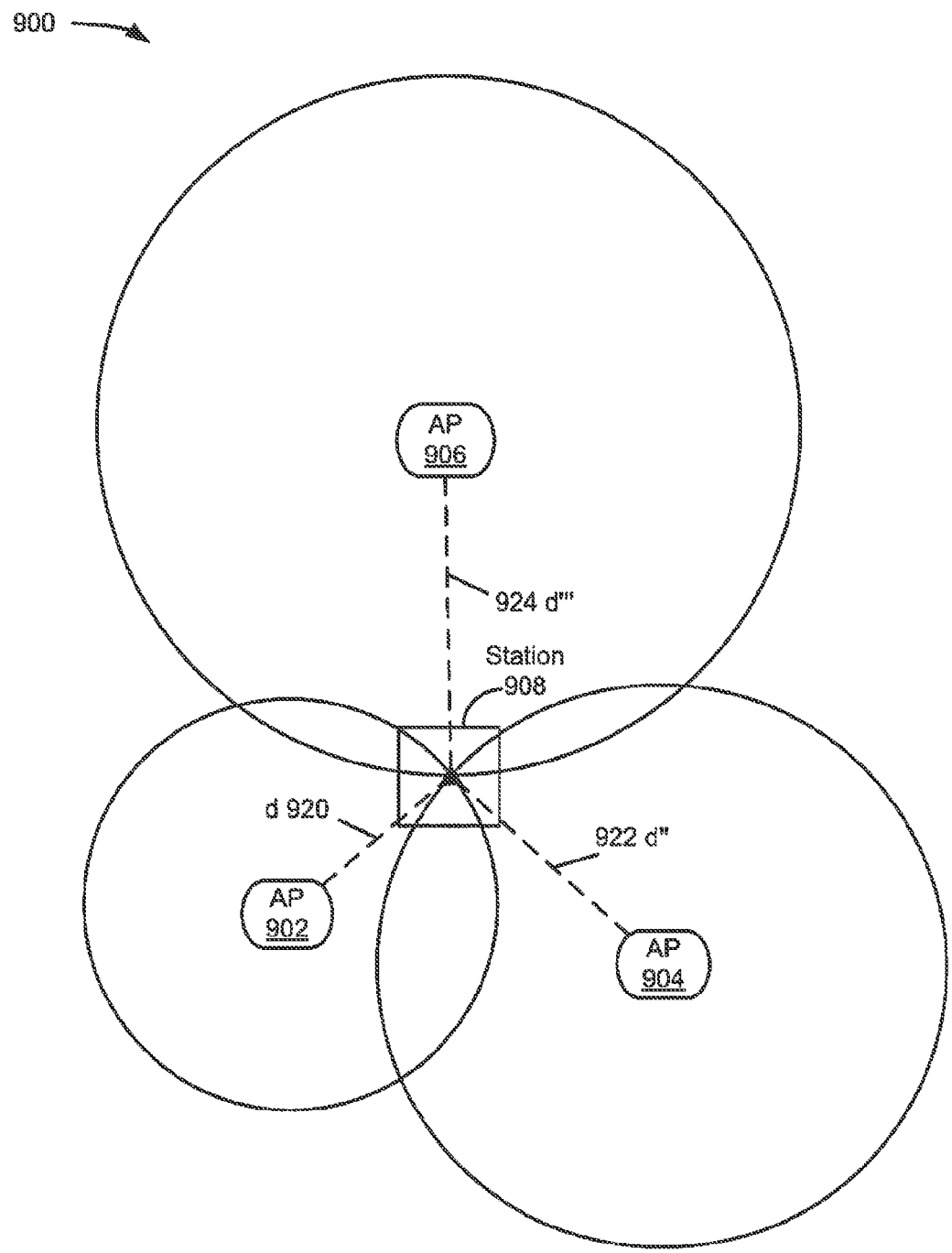
FIG. 9 depicts a diagram of an example of locating a device using three APs.

FIG. 9 depicts a diagram 900 of an example of locating a device using three APs. Diagram 900 includes Access Point (AP) 902, Access Point (AP) 904, Access Point (AP) 906, station 908, distance (d) 920, second distance (d') 922, and third distance (d'") 924. Similarly to FIG. 8, in a two dimensional system, three APs located at different locations may locate a station in exactly one point. AP 902, AP 904, and AP 906 each estimate distances d, d', and d" respectively. d, d', and d" sweep three circles around AP 902, AP 904, and AP 906.

Figure 10:
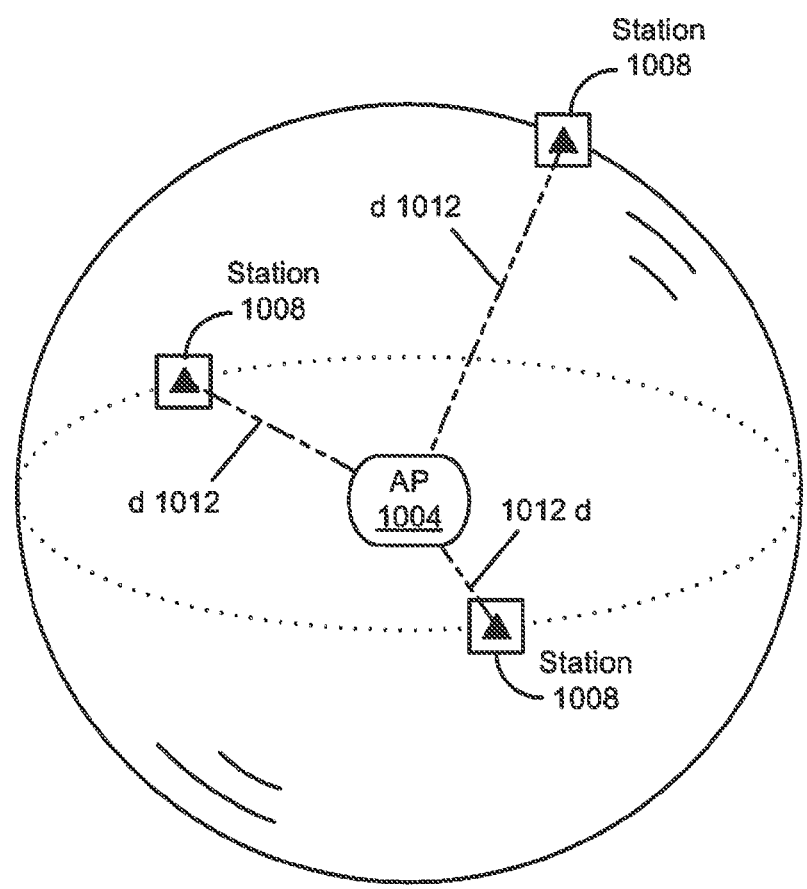
FIG. 10 depicts a diagram of an example of locating a device in three dimensional space using an AP.

FIG. 10 depicts a diagram 1000 of an example of locating a device in three dimensional space using an AP. The system 1000 includes AP 1004, station 1008, and distance (d) 1012. In this case, the AP is able to estimate a distance which can be used to sweep a sphere around the AP. Where AP 1004 is used, station 1008 can, without taking into account physical limitations, may be found at any point, a distance d away from the AP. The multiple locations displayed could be three of many different possible locations lying on the sphere surrounding the AP.

Figure 11:
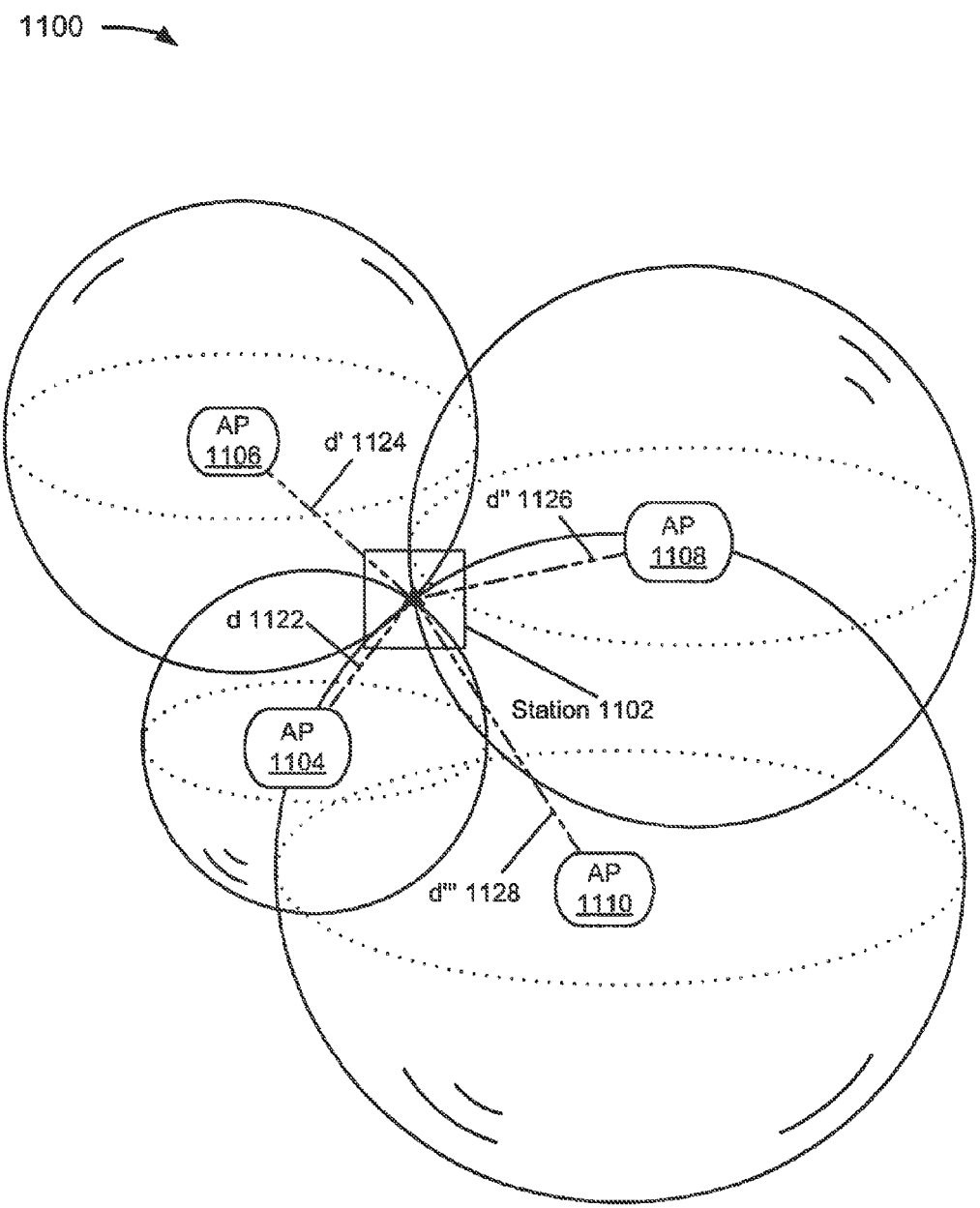
FIG. 11 depicts a diagram of an example of locating a device in three dimensional space using four APs.

FIG. 11 depicts a diagram 1100 of an example of locating a device in three dimensional space using four APs. The system 1100 includes station 1102, AP 1104, AP 1106, AP 1108, AP 1110, distance (d) 1124, second distance (d') 1124, third distance (d'") 1126, fourth distance (d''') 1128.

In three dimensions, it may be necessary to use four APs to identify a single location for station 1102. This is because the intersection between two spheres representing distances d and d' away from APs 1106 and 1108 may be a circle. A circle may intersect with the sphere representing the distance d" away from AP 1108 in two points. Finally, a sphere representing the distance d'" away from AP 1110 may intersect with a single one of the two points. This may identify a single point in three dimensions for a location of station 1102.

Figure 12:
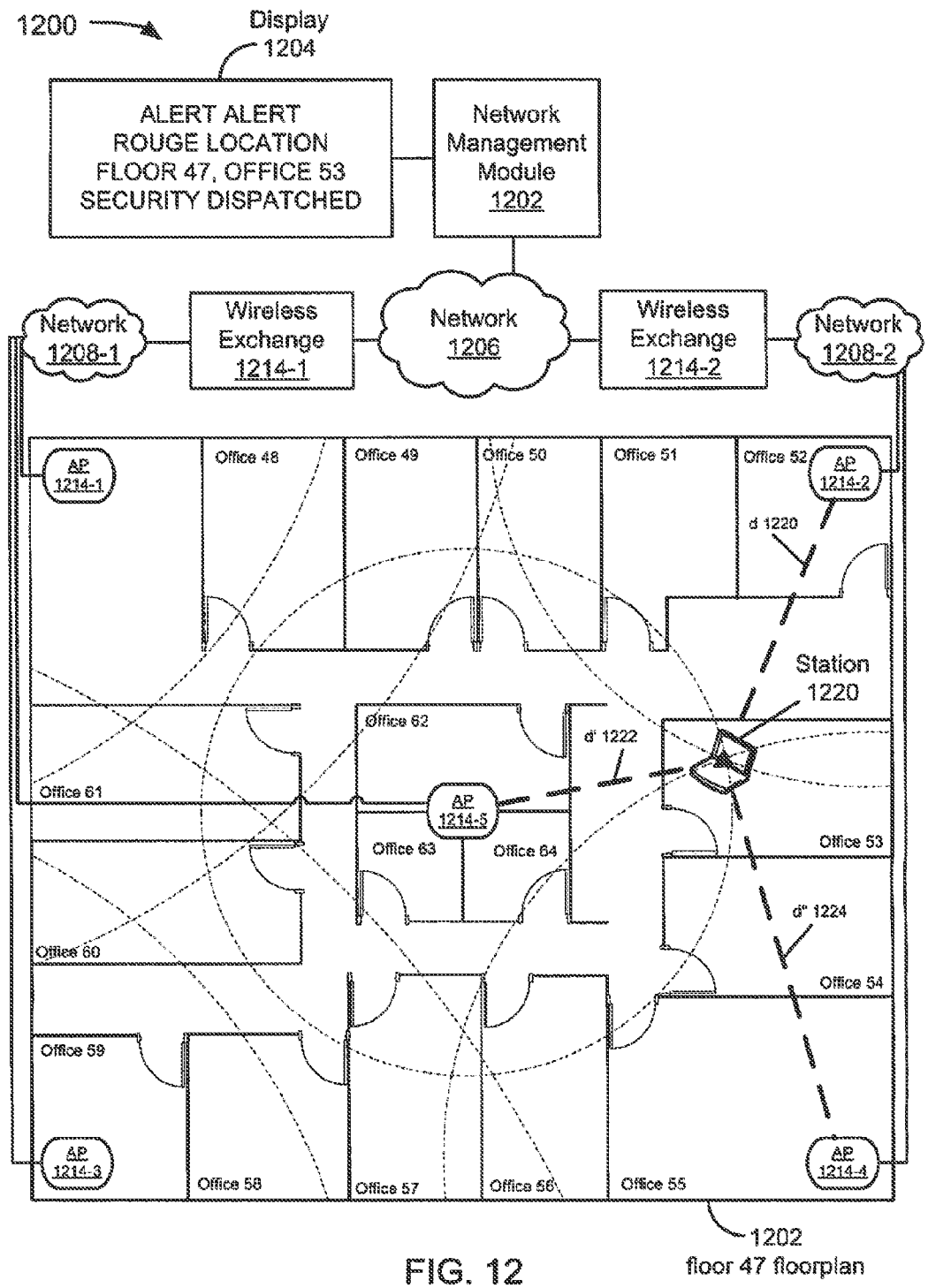
FIG. 12 depicts a diagram of an example of locating a rogue device on a floor plan using a wireless access domain.

FIG. 12 depicts a diagram of an example of locating a rogue device on a floor plan using a wireless access domain. The diagram 1200 includes network management module 1202, display 1204, rogue 1205, network 1206, and wireless access domain 1207. A floorplan is an exemplary two dimensional model in which to locate a station however, many other two dimensional or three dimensional models could be used; this model is for purposes of example and not limitation. Herein, AP 1214-2, AP 1214-4, and AP 1214-5 (Collectively APs 1214) have, as a group, identified the location of a rouge station a distance d away from AP 1214-2, a distance d' away from AP 1214-5, and a distance d" from AP 1214-4. Dashed circles and arcs represent distances away from access points.

In the example of FIG. 12, wireless access domain 1207 contains wireless access areas 108-1 through 108-N, (collectively wireless access areas 1208). Wireless exchange switches 1210-1 to 1210-N (hereinafter collectively referred to as wireless exchange switches 1210), access points 1212-1 to 1212-N (hereinafter collectively referred to as access points 1212), and networks 1214-1 to 1214-N (hereinafter collectively referred to as networks 1214).

In the example of FIG. 12, an operator of station 1220 has placed station 1220 in a hidden area, e.g. an air vent, and has opted to employ station 1220 for malicious purposes, e.g. theft of trade secrets from a system server. A system administrator here may be faced with the options of (1) terminating service on APs 1214, or alternatively (2) eliminating the rogue. Since the system administrator has been given the estimated location of the rogue, security may be dispatched, and the rogue eliminated. This prevents the interruption of service.

Display 1204 may display not only warning messages, such as "Alert," but also may display an entire floor plan animated with information about the location of rogues, clients, APs and other relevant information. Where the rogue is moving, the display may update the position of the rogue in real time.

Figure 13:
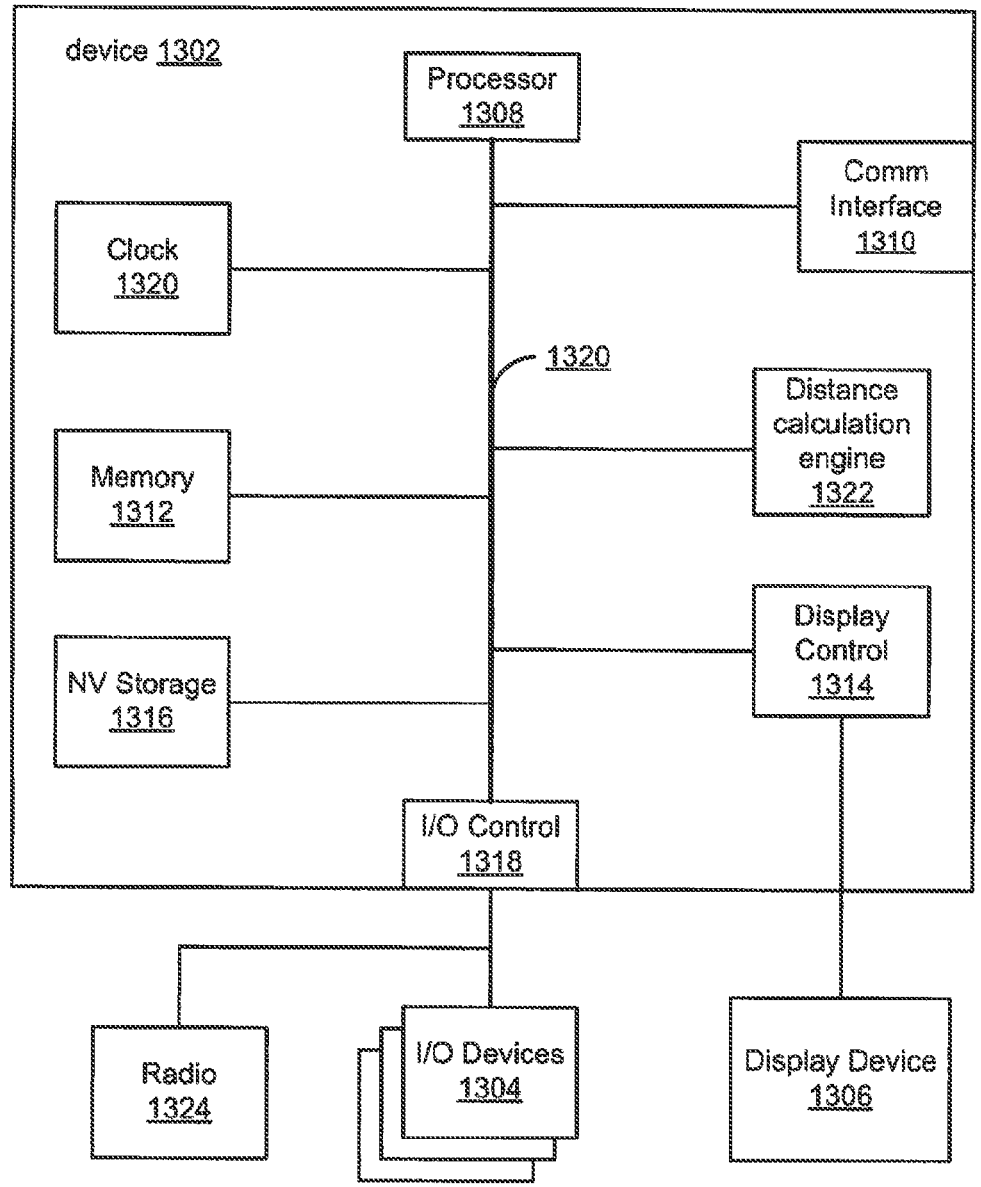
FIG. 13 depicts a diagram of a system capable of calculating a distance to another device.

FIG. 13 depicts a diagram 1300 of a system capable of calculating a distance to another device. The system 1300 may be a conventional computer system that can be used as a client computer system, such as a wireless client or a workstation, or a server computer system. The computer system 1300 includes a device 1302, I/O devices 1304, radio 1324, and a display device 1306. The device 1302 includes a processor 1308, a communications interface 1310, memory 1312, display controller 1314, non-volatile storage 1316, I/O controller 1318, clock 1320, and distance calculation engine 1322. The device 1302 may be coupled to or include the I/O devices 1304, display device 1306, and radio 1324.

The device 1302 interfaces to external systems through the communications interface 1310, which may include a modem or network interface. It will be appreciated that the communications interface 1310 can be considered to be part of the system 1300 or a part of the device 1302. The communications interface 1310 can be an analog modem, ISDN modem, cable modem, token ring interface, ethernet interface, wireless 802.11 interface, satellite transmission interface (e.g. "direct PC"), or other interfaces for coupling a computer system to other computer systems.

The processor 1308 may be, for example, a conventional microprocessor such as an Intel Pentium microprocessor or Motorola power PC microprocessor. The memory 1312 is coupled to the processor 1308 by a bus 1320. The memory 1312 can be Dynamic Random Access Memory (DRAM) and can also include Static RAM (SRAM). The bus 1320 couples the processor 1308 to the memory 1312, also to the non-volatile storage 1316, to the display controller 1314, and to the I/O controller 1318.

The I/O devices 1304 can include a keyboard, disk drives, printers, a scanner, and other input and output devices, including a mouse or other pointing device. The display controller 1314 may control in the conventional manner a display on the display device 1306, which can be, for example, a cathode ray tube (CRT) or liquid crystal display (LCD). The display controller 1314 and the I/O controller 1318 can be implemented with conventional well known technology.

The non-volatile storage 1316 is often a magnetic hard disk, an optical disk, or another form of storage for large amounts of data. Some of this data is often written, by a direct memory access process, into memory 1312 during execution of software in the device 1302. One of skill in the art will immediately recognize that the terms "machine-readable medium" or "computer-readable medium" includes any type of storage device that is accessible by the processor 1308 and is intended to encompass a carrier wave that encodes a data signal to the extent that such a carrier wave is patentable.

Clock 1320 can be any kind of oscillating circuit creating an electrical signal with a precise frequency. In a non-limiting example, clock 1320 could be a crystal oscillator using the mechanical resonance of vibrating crystal to generate the electrical signal.

Distance calculation engine 1322 includes functionality to estimate a distance between a first computing system and a second computing system.

Radio 1324 may be any combination of known or convenient electrical components including by way of example, but not limitation, transistors, capacitors, resistors, multiplexers, wiring, registers, diodes or any other electrical components known or convenient.

The system 1300 is one example of many possible computer systems which have different architectures. For example, personal computers based on an Intel microprocessor often have multiple buses, one of which can be an I/O bus for the peripherals and one that directly connects the processor 1308 and the memory 1312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1312 for execution by the processor 1308. A Web TV system, which is known in the art, is also considered to be a computer system, but it may lack some of the features shown in FIG. 13, such as certain input or output devices. A typical computer system will usually include at least a processor, memory, and a bus coupling the memory to the processor.

In addition, the system 1300 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1316 and causes the processor 1308 to execute the various acts required by the operating system to input and output data and to store data in memory, including storing files on the non-volatile storage 1316.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present example is not described with reference to any particular programming language, and various examples may thus be implemented using a variety of programming languages.

What is claimed is:

1. An apparatus, comprising:
a first access point configured to be operatively coupled to (1) a network management module, and (2) a station, the first access point configured to transmit a frame to the station,
if an acknowledgement frame is received from the station in response to the frame, the first access point configured to send an instruction to the network management module to estimate a distance between the station and the first access point, if the acknowledgement frame is not received from the station in response to the frame, the first access point configured to (1) deny the station access to a network, and (2) send an instruction to the network management module to send an address of the station to a second access point such that the second access point is configured to deny the station access to the network.

2. The apparatus of claim 1, wherein:

the frame is a first frame, the distance is a first distance, and the acknowledgement frame is a first acknowledgment frame, the first access point is configured to transmit a second frame to the station, if a second acknowledgement frame is received from the station in response to the second frame, the first access point is configured to send an instruction to the network management module to estimate a second distance between the station and the first access point such that the network management module defines a third distance based on the first distance and the second distance.

3. The apparatus of claim 1, wherein the first access point is configured to be operatively coupled to a graphical display that is configured to display a predicted location of the station based on the first distance.

4. The apparatus of claim 1, wherein the first access point is configured to be operatively coupled to a graphical display that is configured to display an alarm indicative of a determination that the station is a rogue station.

5. The apparatus of claim 1, wherein, if the acknowledgement frame is received from the station in response to the frame, the first access point is configured to send the instruction to the network management module such that the network management module estimates the distance based on a time the acknowledgement frame was sent and a time the instruction was received.

6. The apparatus of claim 1, wherein the frame includes an inaccurate frame control field sequence number.

7. The apparatus of claim 1, wherein the frame is a null frame.

8. An apparatus, comprising:

a network management module configured to be operatively coupled to (1) a first access point that transmits a frame to a station, and (2) a second access point, if an acknowledgement frame is received from the station in response to the frame, the network management module configured to estimate, in response to an instruction received from the first access point, a distance between the station and the first access point, if the acknowledgement frame is not received from the station in response to the frame, the network management module configured to send, in response to an instruction received from the first access point, an address of the station to the second access point such that the second access point is configured to deny the station access to the network.

9. The apparatus of claim 8, wherein:

the frame is a first frame, the distance is a first distance, and the acknowledgement frame is a first acknowledgment frame, the network management module is configured to be operatively coupled to the first access point that is configured to transmit a second frame to the station, if a second acknowledgement frame is received from the station in response to the second frame, the network management module is configured to, in response to an instruction received from the first access point, (1) estimate a second distance between the station and the first access point, and (2) define a third distance based on the first distance and the second distance.

10. The apparatus of claim 8, wherein the network management module is configured to be operatively coupled to a graphical display that is configured to display a predicted location of the station based on the first distance.

11. The apparatus of claim 8, wherein the network management module is configured to be operatively coupled to a graphical display that is configured to display an alarm indicative of a determination that the station is a rogue station.

12. The apparatus of claim 8, wherein:

the network management module is configured to be operatively coupled to a third access point, the network management module is configured to estimate a location of the station based on (1) the distance between the station and the first access point, (2) a distance between the station and the second access point, and (3) a distance between the station and the third access point.

13. The apparatus of claim 8, wherein the network management module is configured to estimate the distance based on a time the acknowledgement frame was sent and a time the instruction was received.

14. The apparatus of claim 8, wherein:

the network management module is configured to define an estimated first location of the station and an estimated second location of the station, the network management module is configured to disregard the estimated second location of the station based on a plurality of available locations on a floor plan.

15. The apparatus of claim 8, wherein the frame is a null frame.

16. A method, comprising:

transmitting, from a first access point and to a station, a frame;

if an acknowledgement frame is received from the station in response to the frame, sending, from the first access point and to a network management module, an instruction to estimate a distance between the station and the first access point, if the acknowledgement frame is not received from the station in response to the frame, (1) denying the station access to a network, and (2) sending, from the first access point and to the network management module, an instruction to send an address of the station to a second access point such that the second access point is configured to deny the station access to the network.

17. The method of claim 16, further comprising sending the instruction such that a graphical display shows and estimated location of the station on a floor plan.

18. The method of claim 16, wherein the frame is a first frame, the distance is a first distance, and the acknowledgement frame is a first acknowledgment frame, the method further comprising:

sending, from the first access point and to the station, a second frame, if a second acknowledgement frame is received from the station in response to the second frame, sending, from the first access point and to a network management module, an instruction to estimate a second distance between the station and the first access point.

19. The method of claim 16, wherein the frame is a first frame, the distance is a first distance, and the acknowledgement frame is a first acknowledgment frame, the method further comprising:
sending, from the first access point and to the station, a second frame,
if a second acknowledgement frame is received from the station in response to the second frame:
sending, from the first access point and to a network management module, an instruction to estimate a second distance between the station and the first access point; and
defining a third distance based on the first distance and the second distance.

20. The method of claim 16, wherein a payload of the frame is empty.

* * * * *